W. Spangler,
Wood Auger.
№ 11,280.   Patented July 11, 1854.

UNITED STATES PATENT OFFICE.

WASHINGTON SPANGLER, OF HARPERS FERRY, VIRGINIA, ASSIGNOR TO HIMSELF, E. H. CHAMBERS, AND WM. F. WILSON.

AUGERS, GIMLETS, &c.

Specification of Letters Patent No. 11,280, dated July 11, 1854.

*To all whom it may concern:*

Be it known that I, WASHINGTON SPANGLER, of Harpers Ferry, in the county of Jefferson and State of Virginia, have invented and made certain new and useful Improvements in the Construction and Form of Augers and Gimlets; and I do hereby declare that the following is a full, clear, and exact description of the method of construction and mode of operating the same, reference being had to the accompanying drawings, and making a part of this specification, in which—

Figure 4:
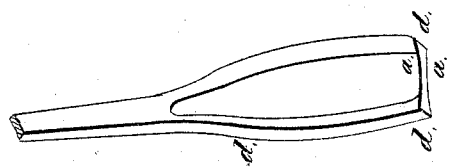
Fig. 4, is a portion of blank, metal, showing form, having concave faces $a$, $a$, and bevel cutting edges $s$, $s$.

To enable others to be skilled in the use and application of my invention and improvements, I will proceed to describe the construction and operation thereof, the nature and principles of which, consist in constructing augers and gimlets after the manner represented by Diagrams Nos. 1, 2, 3. That is, in the forming the same, the metal may be forged out somewhat in the manner ordinarily resorted to, except that in some of my augers, instead of leaving the two edges square with parallel lines, and of the same width (as is always the case in the usual mode of construction,) I taper the metal slightly from each end toward the center, and likewise make the metal slightly concave, and thinner in the middle, and in producing an auger or gimlet, to cut outward from left to right, in the direction indicated by the arrow. Bevel cutting edges are formed as shown by Fig. 4, $d$, $d$, $d$.

I do not, however, confine myself to the formation of my augers and gimlets out of one peculiar form of metal, but the same shapes may be turned or filed, out of solid cylindrical or polygonal shapes of metal.

Now the great desideratum to be gained by my peculiarly constructed augers and gimlets, is, that a person is enabled to use them with these important advantages, viz: In boring iron, or hard knotty wood, there is no possibility of the auger or gimlet snapping or twisting off; because, the two bevel cutting edges of the spiral being formed on a slightly tapering or conical shape, in each turn of an auger or gimlet, the two cutting edges each, detach thin chips or shavings, which are taken off in an oblique direction, and thus each turn of the tool causes the relieving of the next following cut, whereby the friction produced in using the ordinary parallel edge twist screw auger, or gimlets is entirely overcome, and the augers of my form of construction, clean, relieve, or free themselves readily of all chips, or shavings. Again, too, the thinnest piece of wood may be bored or perforated, without splitting, which cannot be avoided in the use of screw augers or gimlets, having parallel edges which afford no cutting metal, except, only at the lower part or first turn of the screw, commonly termed the lips. Thus in the ordinary screw auger, because of the diameter being generally uniform or equal, throughout its length, the tool binds itself, in its track or passage, and is not enabled to free or clear itself; consequently, friction ensues; the metal of the tool becomes heated; expands in its bore; and in boring, any great depth, the tool becomes choked, difficult to turn, and very often is strained, bent, and sometimes snapped in parts, and rendered useless. Again, in the use of the best improved augers or gimlets, now employed generally; it has been found almost impossible, or very difficult to use them in knots, brash, or end wood, as they would not "bite" or take hold; consequently much trouble, delay, and imperfection in boring have been attendant upon the use of the ordinary augers and gimlets. These difficulties above cited, are however, entirely overcome, and the operation of boring or perforating knots, brash, or end wood, is rendered easy and certain, by the use of my improved double cutting bevel edge, conically twisted augers and gimlets. The utility and value of my improvements, can be readily ascertained, by practical experimental comparison and test with all other augers and gimlets ever invented and now used; the superiority of mine will be unhesitatingly conceded, in every particular point claimed, and the very best test, will be in boring end wood, wherein, it will be seen, that my augers and gimlets, take hold as readily longitudinally, or with the grain, as across, or transversely through the grain. Indeed, so easily do my augers and gimlets take hold of, and enter metal or wood, that little or no manual effort or pressure is required in the application or use of my improvements. I have also found, that with my improvements, a piece of thin wood may be perforated without splitting. This result cannot be attained by any other augers of screw shape heretofore used, and which can scarcely be accomplished even with a center bit.

Especially in ship carpentry and naval architecture will my improved augers and gimlets be found useful and most effectual; where the bore or perforation, has to be made obliquely through knots, cross grain, or tough wood.

Figure 2:
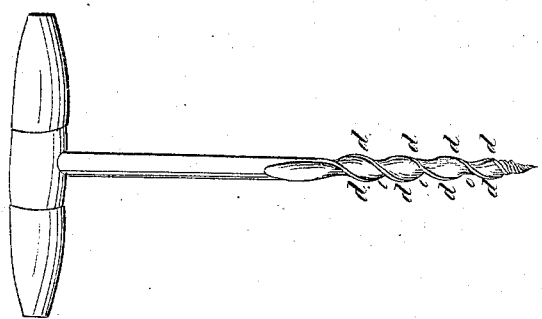
Fig. 2, is a gimlet without any lip or cutting end, but simply has a twist, increasing in width, from the extreme part, forming a slightly conical shape, the cutting edges $d$, $d$, $d$, $d$, $d$, $d$, $d$, $d$, being beveled from right to left.
Figure 1:
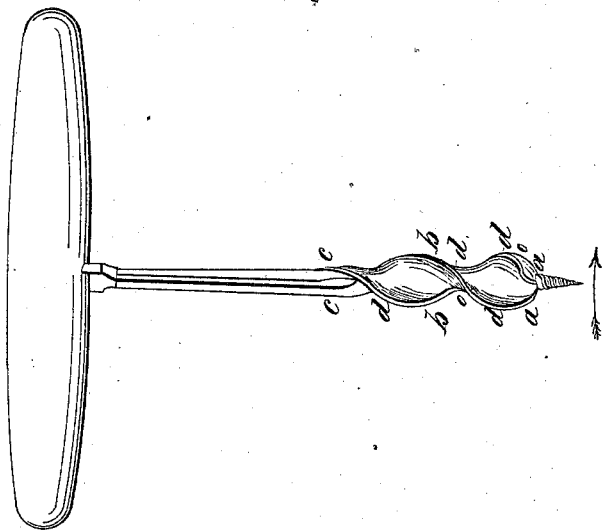
Figure 1, is a diagram of a complete gimlet or auger for boring metal or hard wood, or knots. The lip or biting part $a$, $a$, are not sharp or pointed, but are rounded, and gradually increasing in width toward the center $b$, $b$, of the twist, and thence diminishing toward the stem or shank $c$, $c$. $d$, $d$, $d$, $d$, $d$, show the bevel cutting edges.
Figure 3:
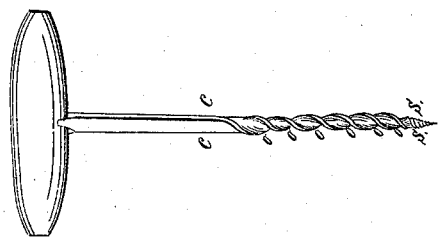
Fig. 3, is a small gimlet, the twist representing a series of cones $o$, $o$, $o$, $o$, $o$, $o$, increasing from the top of point $s$, $s$, toward the stem or shank $c$, $c$, of the gimlet.

Deeming a more detailed description of my improvements unnecessary, and believing the new principle of construction pertaining thereto is plainly understood; and the important results, ensuing from the use thereof deemed of sufficient importance to the mechanical artisan, to be approved universally, what I claim as of my invention, and desire to secure by Letters Patent of the United States, is as follows, viz:

I claim inventing and constructing augers and gimlets, out of any desired shape of metal, by filing, turning or in any equivalent manner, or using tapering pieces of metal, concave, on one, or both sides, as Fig. 4, and forming two bevel cutting edges, $d, d, d, d, d, d, d$, on graduated, or regularly diminished conical twists $o, o, o, o, o, o$, as shown complete in Figs. 1, 2, 3, and substantially as described.

WASHINGTON SPANGLER.

Witnesses:
JOHN STAHL,
HENRY T. SELLER.